US011916664B2

(12) United States Patent
Leung

(10) Patent No.: US 11,916,664 B2
(45) Date of Patent: *Feb. 27, 2024

(54) CODEC CONFIGURATION ADAPTATION BASED ON PACKET LOSS RATE

(71) Applicant: QUALCOMM Incorporated, San Diego, CA (US)

(72) Inventor: Nikolai Konrad Leung, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,038

(22) Filed: Mar. 23, 2023

(65) Prior Publication Data

US 2023/0246733 A1 Aug. 3, 2023

Related U.S. Application Data

(63) Continuation of application No. 17/446,804, filed on Sep. 2, 2021, now Pat. No. 11,626,938, which is a
(Continued)

(51) Int. Cl.
*H04L 1/00* (2006.01)
*H04L 12/26* (2006.01)
(Continued)

(52) U.S. Cl.
CPC ........ *H04L 1/0009* (2013.01); *H04L 43/0829* (2013.01); *H04W 24/02* (2013.01)

(58) Field of Classification Search
CPC ... H04L 1/0009; H04L 43/0829; H04W 24/02
(Continued)

(56) References Cited

U.S. PATENT DOCUMENTS 11,133,888 B2 9/2021 Leung
2004/0141551 A1 7/2004 Forbes et al.
(Continued)

FOREIGN PATENT DOCUMENTS

WO 0230098 A2 4/2002
WO 2013059499 4/2013
(Continued)

OTHER PUBLICATIONS

International Search Report and Written Opinion—PCT/US2020/031439—ISA/EPO—dated Aug. 6, 2020.

*Primary Examiner* — Gbemileke J Onamuti
(74) *Attorney, Agent, or Firm* — QUALCOMM Incorporated

(57) ABSTRACT

A method of communication includes receiving configuration data at a first device, the configuration data indicating a first packet loss rate threshold associated with a first codec configuration. The method includes determining a packet loss rate at the first device, the packet loss rate associated with one or more first packets received at the first device from a second device. The method includes, based on determining that a decoder of the first device has the first codec configuration and that the packet loss rate satisfies the first packet loss rate threshold, sending, to the second device, a request to change a codec configuration of the second device. The method also includes receiving a second packet at the first device from the second device, the second packet encoded based on a second codec configuration.

22 Claims, 9 Drawing Sheets

Related U.S. Application Data continuation of application No. 16/865,579, filed on May 4, 2020, now Pat. No. 11,133,888.

(60) Provisional application No. 62/843,826, filed on May 6, 2019, provisional application No. 62/866,728, filed on Jun. 26, 2019.

(51) Int. Cl.
*H04W 24/02* (2009.01)
*H04L 43/0829* (2022.01)

(58) Field of Classification Search
USPC .......................................................... 370/230
See application file for complete search history.

(56) References Cited

U.S. PATENT DOCUMENTS

| | | |
|---|---|---|
| 2012/0044931 A1 | 2/2012 | Harper et al. |
| 2013/0215774 A1 | 8/2013 | Bender et al. |
| 2014/0105041 A1 | 4/2014 | Swaminathan et al. |
| 2019/0045578 A1 | 2/2019 | Oyman et al. |
| 2020/0358552 A1 | 11/2020 | Leung |
| 2021/0399829 A1 | 12/2021 | Leung |

FOREIGN PATENT DOCUMENTS

| | | |
|---|---|---|
| WO | 2017069911 A1 | 4/2017 |
| WO | 2018144928 A1 | 8/2018 |

| | Description 202 | Format 204 |
|---|---|---|
| PLR Average Window 162 | Duration of sliding average window over which PLR is measured | In milliseconds |
| Codec Config List 164 | Lists all the codec configurations of the codecs supported for a particular media type (m=video, audio) in order of decreasing robustness to packet losses | MIME_type_of_codec; Codec_mode (?): Application_layer_redundancy (0-300%) |
| High PLR Threshold List 166 | Lists the upper PLR threshold for the codec configuration in the Codec_config_list above which the UE is required to request adaptation to the next more robust code configuration. The entry for the most robust codec configuration is not used as the UE cannot adapt to a more robust configuration. | PLR_threshold (units of 10E-4) |
| Low PLR Threshold List 168 | Lists the lower PLR threshold for the codec configuration in the Codec_config_list above which the UE is required to request adaptation to the next more robust code configuration. The entry for the least robust codec configuration is not used as the UE cannot adapt to a less robust configuration. | PLR_threshold (units of 10E-4) |
| High PLR Adapt. Rqst Type 172 | Lists the type of request message sent for each codec configuration in Codec_config_list for adaption to the next most robust configuration. The entry for the most robust codec configuration is not used as the UE cannot adapt to a more robust configuration. | Speech_CMR Speech_RTCP_APP Video request type |
| Low PLR Adapt. Rqst Type 174 | Lists the type of request message sent for each codec configuration in Codec_config_list for adaption to the next less robust configuration. The entry for the least robust codec configuration is not used as the UE cannot adapt to a less robust configuration. | Speech_CMR Speech_RTCP_APP Video request type |

PLR Average Window 162

| Codec Config List 164 | High PLR Threshold List 166 | Low PLR Threshold List 168 | High PLR Adapt. Rqst. Type 172 | Low PLR Adapt. Rqst Type 174 |
|---|---|---|---|---|
| Codec Config. 302 | | Low PLR Threshold 342 | | Low PLR Adapt. Rqst. Type 382 |
| Codec Config. 304 | High PLR Threshold 324 | Low PLR Threshold 344 | High PLR Adapt. Rqst. Type 364 | Low PLR Adapt. Rqst. Type 384 |
| Codec Config. 306 | High PLR Threshold 326 | Low PLR Threshold 346 | High PLR Adapt. Rqst. Type 366 | Low PLR Adapt. Rqst. Type 386 |
| Codec Config. 308 | High PLR Threshold 328 | Low PLR Threshold 348 | High PLR Adapt. Rqst. Type 368 | Low PLR Adapt. Rqst. Type 388 |
| Codec Config. 310 | High PLR Threshold 330 | Low PLR Threshold 350 | High PLR Adapt. Rqst. Type 370 | Low PLR Adapt. Rqst. Type 390 |
| Codec Config. 312 | High PLR Threshold 332 | | High PLR Adapt. Rqst. Type 372 | |

*FIG. 3*

| Description 702 | Format 704 |
|---|---|
| PLR Average Window 162 — Duration of sliding average window over which PLR is measured | In milliseconds |
| Codec Config List 164 — Lists all the codec configurations of the codecs supported for a particular media type (m=video, audio) in order of decreasing robustness to packet losses | MIME_type_of_codec: Codec_mode (?): Application_layer_redundancy (0-300%) |
| High PLR Threshold List 166 — Lists the upper PLR threshold for the codec configuration in the Codec_config_list above which the UE is required to request adaptation to the next more robust code configuration. The entry for the most robust codec configuration is not used as the UE cannot adapt to a more robust configuration. | PLR_threshold (units of 10E-4) |
| Low PLR Threshold List 168 — Lists the lower PLR threshold for the codec configuration in the Codec_config_list above which the UE is required to request adaptation to the next more robust code configuration. The entry for the least robust codec configuration is not used as the UE cannot adapt to a less robust configuration. | PLR_threshold (units of 10E-4) |
| De-Jitter Buffer PLR Indicator 672 — Indicates whether the PLR estimate for comparing against the thresholds in the High PLR threshold list and the low PLR threshold list is measured before or after the de-jitter buffer | 0: pre-de-jitter buffer PLR measurement  1: post-de-jitter buffer PLR measurement |

700 

*FIG. 7*

CODEC CONFIGURATION ADAPTATION BASED ON PACKET LOSS RATE

I. CROSS-REFERENCE TO RELATED APPLICATIONS

The present application claims priority from and is a continuation of pending U.S. patent application Ser. No. 17/446,804, filed Sep. 2, 2021, and entitled "CODEC CONFIGURATION ADAPTATION BASED ON PACKET LOSS RATE," which claims priority from and is a continuation of U.S. patent application Ser. No. 16/865,579, filed May 4, 2020, entitled "CODEC CONFIGURATION ADAPTATION BASED ON PACKET LOSS RATE," and issued as U.S. Pat. No. 11,133,888, which claims priority from U.S. Provisional Patent Application No. 62/843,826, filed May 6, 2019, entitled "CODEC CONFIGURATION ADAPTATION BASED ON PACKET LOSS RATE," and from Provisional Patent Application No. 62/866,728, filed Jun. 26, 2019, entitled "CODEC CONFIGURATION ADAPTATION BASED ON PACKET LOSS RATE," the content of each of which is incorporated by reference herein in its entirety.

II. FIELD

The present disclosure is generally related to adjusting a configuration of a coder-decoder (codec) based on a packet loss rate.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Communication of data to such devices, such as encoded audio data sent to a mobile phone device during a phone call, can be impacted based on a rate of packet loss associated with transmitting the data. For example, the encoded audio data can be transmitted via a wireless network as a stream of packets from a sending device to a mobile phone device. One or more packets of the audio data stream can be "lost," such as a packet that is dropped due to a buffer overflow at a network switch, or a packet that is delayed so that the audio data of the packet is not available in time for playback at the mobile phone device. When packets are lost at a sufficiently high rate, a perceptible loss of audio quality can result, impairing a user's experience.

IV. SUMMARY

In a particular aspect, a method of communication includes receiving configuration data at a first device from a configuration server, the configuration data indicating a first packet loss rate threshold associated with a first codec configuration. The method includes determining a packet loss rate at the first device, the packet loss rate associated with one or more first packets received at the first device via a network from the second device. The method includes, based on determining that a decoder of the first device has the first codec configuration and that the packet loss rate satisfies the first packet loss rate threshold, sending, to the second device, a request to change a codec configuration of a second device. The method also includes receiving a second packet at the first device via the network from the second device, the second packet encoded based on a second codec configuration.

In another particular aspect, a device includes a memory and one or more processors. The memory is configured to store configuration data received from a configuration server. The configuration data indicates a first packet loss rate threshold associated with a first codec configuration. The one or more processors are configured to determine a packet loss rate associated with one or more first packets received via a network from a second device. The one or more processors are configured, based on determining that a decoder has the first codec configuration and that the packet loss rate satisfies the first packet loss rate threshold, to send, to the second device, a request to change a codec configuration of the second device. The one or more processors are also configured to receive, via the network from the second device, a second packet encoded based on a second codec configuration.

In another particular aspect, a non-transitory computer-readable medium includes instructions that, when executed by one or more processors of a device, cause the one or more processors to perform operations for communication. The operations include receiving configuration data at a first device from a configuration server. The configuration data indicates a first packet loss rate threshold associated with a first codec configuration. The operations include determining a packet loss rate at the first device. The packet loss rate is associated with one or more first packets received at the first device via a network from a second device. The operations include, based on determining that a decoder of the first device has the first codec configuration and that the packet loss rate satisfies the first packet loss rate threshold, sending, to the second device, a request to change a codec configuration of the second device. The operations also include receiving a second packet at the first device via the network from the second device. The second packet is encoded based on a second codec configuration.

In another particular aspect, an apparatus includes means for receiving configuration data at a first device from a configuration server. The configuration data indicates a first packet loss rate threshold associated with a first codec configuration. The apparatus includes means for determining a packet loss rate at the first device. The packet loss rate is associated with one or more first packets received at the first device via a network from a second device. The apparatus includes means for sending a request to the second device to change a codec configuration of the second device. The request is sent based on determining that a decoder of the first device has the first codec configuration and that the packet loss rate satisfies the first packet loss rate threshold. The apparatus also includes means for receiving a second packet at the first device via the network from the second device. The second packet is encoded based on a second codec configuration.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIG. 2 is a table of examples of descriptions and formats of configuration data generated by the system of FIG. 1;

FIG. 3 is a diagram of an illustrative example of configuration data that may be generated by the system of FIG. 1;

FIG. 7 is a table of examples of descriptions and formats of configuration data generated by the system of FIG. 6;

VI. DETAILED DESCRIPTION

Figure 1:
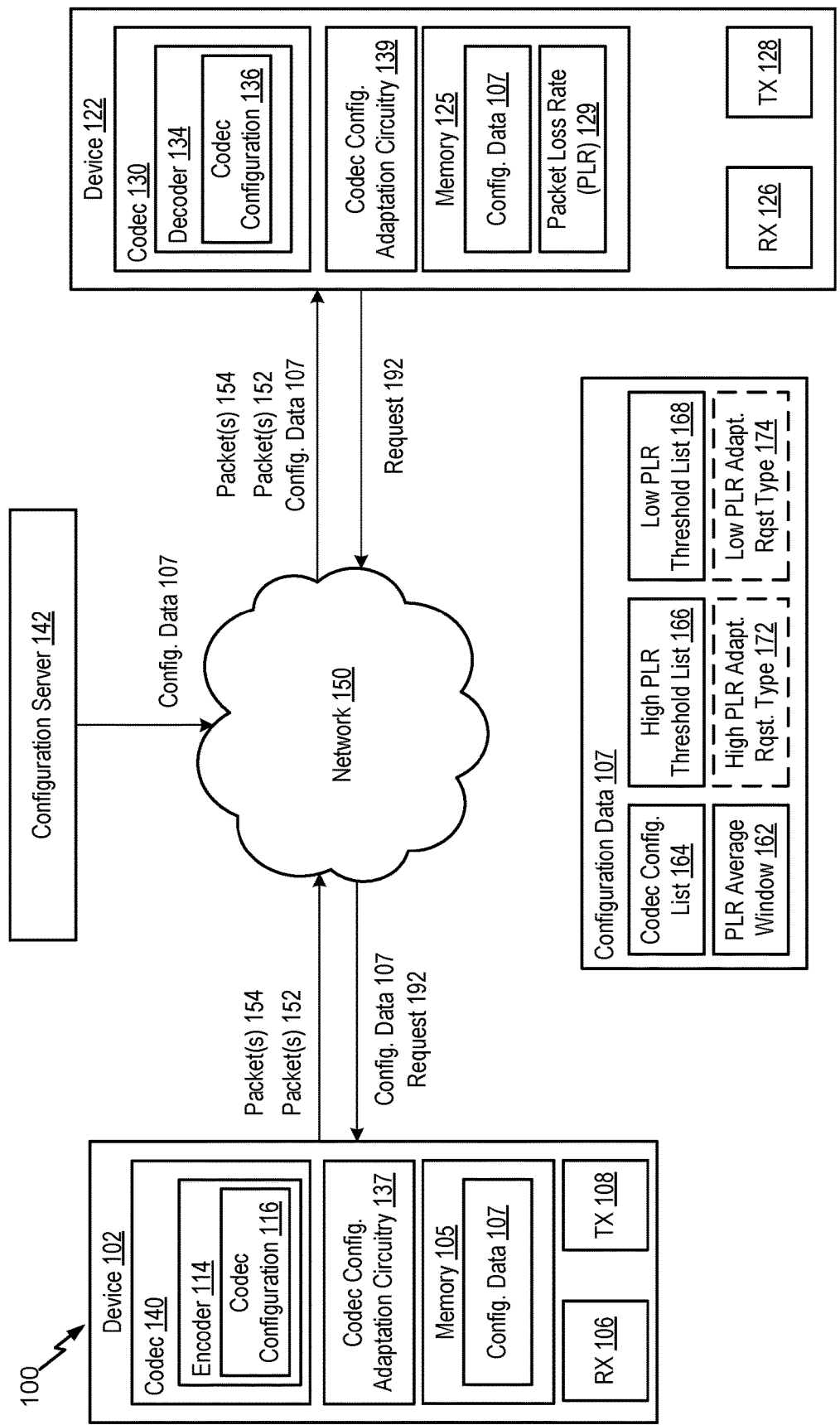
FIG. 1 is a block diagram of a particular illustrative aspect of a system operable to adapt a codec configuration based on packet loss rate.

Audio data transmitted from a sending device to a receiving device can be impacted based on a rate of packet loss associated with transmission of the data. For example, the audio data can be transmitted as a stream of packets over a wireless network. When packets are lost at a sufficiently high rate, a perceptible loss of audio quality can result, impairing a user's experience.

Effects of packet loss can be at least partially mitigated by adjusting a codec mode associated with encoding the audio data at the sending device and decoding the audio data at the receiving device. For example, some codec modes can include an encoding technique that provides a lower "robustness" to packet loss (e.g., can tolerate a relatively smaller rate of packet loss) and other codec modes can include another encoding technique that provides a higher robustness to packet loss (e.g., can tolerate a relatively larger rate of packet loss). Thus, when a packet loss rate becomes too high for a particular codec mode, each of the sending device and the receiving device can adjust its respective codec to operate in a more robust mode. Similarly, when a packet loss rate is low enough, the codecs at the sending device and the receiving device can be adjusted to operate in a less robust codec mode that may use less bandwidth, consume less power, enable higher audio quality (e.g., bandwidth that was used for data redundancy can be reallocated to provide enhanced audio information), or a combination thereof.

However, if the sending device and the receiving device fail to adjust the codec configuration in lockstep with each other, a transmission error can result. In an illustrative example, if the sending device and the receiving device are from different manufacturers and have differing settings regarding what an acceptable packet loss rate is for a particular codec configuration, the devices may be unable to efficiently negotiate as to when to transition from a first codec configuration to a second, more robust codec configuration. As another example, the devices may be unable to efficiently negotiate as to which codec configuration is to be used as the second, more robust codec configuration.

In accordance with various implementations disclosed herein, the sending device and the receiving device receive codec configuration data from a third device, such as a configuration server of an operator of the network. The codec configuration data indicates multiple allowable codec configurations and packet loss rate thresholds associated with each of the codec configurations. The sending device and the receiving device can access the codec configuration data to determine when to adjust codec modes based on comparing a determined packet loss rate to the packet loss rate thresholds in the configuration data and to select the next codec configuration mode to be used. As a result, the sending device and the receiving device can more efficiently adapt to changing network conditions to provide enhanced audio transmission as compared to systems in which inefficient or ineffective negotiations to change codec configurations result in continued use of a codec configuration that is no longer appropriate for the changing network conditions.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

In the present disclosure, terms such as "determining", "calculating", "estimating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "estimating", "using", "selecting", "accessing", and "determining" may be used interchangeably. For example, "generating", "calculating", "estimating", or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system is disclosed and generally designated 100. The system 100 includes a configuration server 142 communicatively coupled via a network 150 to one or more devices, such as a device 102 and the device 122. In a particular aspect, the device 102 (or the device 122) can enter, exit, or move within a coverage area of the network 150 at various times. The network 150 includes a wired network, a wireless network, or both. The configuration server 142 is configured to send configuration data 107 to the device 102, the device 122, or both, to facilitate codec configuration changes at the device 102 and the device 122.

The device 102 includes a codec 140, codec configuration adaptation circuitry 137, a memory 105, a receiver 106, a transmitter 108, or a combination thereof. The codec 140 includes an encoder 114, a decoder (not illustrated), or both. The encoder 114 is configured to generate encoded packets based on a codec configuration 116. The transmitter 108 is configured to transmit the encoded packets via the network 150 to the device 122. The receiver 106 is configured to receive a request 192 via the network 150 from the device 122. The codec configuration adaptation circuitry 137 is configured to, in response to receipt of the request 192, update the codec configuration 116 based on the configuration data 107, as described herein. The memory 105 is configured to store the configuration data 107.

The device 122 includes a codec 130, codec configuration adaptation circuitry 139, a memory 125, a receiver 126, a transmitter 128, or a combination thereof. The codec 130 includes an encoder (not illustrated), a decoder 134, or both. The receiver 126 is configured to receive the encoded packets via the network 150 from the device 102. The decoder 134 is configured to generate decoded packets by decoding the encoded packets based on a codec configuration 136. The codec configuration adaptation circuitry 137 is configured to determine a packet loss rate (PLR) 129, as described herein. The codec configuration adaptation circuitry 137 is configured to generate, based on the PLR 129 and the configuration data 107, the request 192 to change a codec configuration. The transmitter 128 is configured to send the request 192 via the network 150 to the device 102. The memory 105 is configured to store the configuration data 107, the PLR 129, or both.

During operation, the configuration server 142 generates the configuration data 107. In a particular aspect, the configuration data 107 is based on default data, user input, a configuration setting, or a combination thereof. The configuration data 107 includes a PLR average window duration 162, a codec configuration list 164, a high PLR threshold list 166, a low PLR threshold list 168, a high PLR adaptation request type list 172, a low PLR adaptation request type list 174, or a combination thereof. The configuration data 107 including lists is provided as an illustrative example. In other examples, the configuration data 107 includes other data structures such as sets, tables, arrays, or a combination thereof. In a particular aspect, the configuration data 107 includes one or more open mobile alliance (OMA) device management (DM) standardized objects to specify one or more of the PLR average window duration 162, the codec configuration list 164, the high PLR threshold list 166, the low PLR threshold list 168, the high PLR adaptation request type list 172, or the low PLR adaptation request type list 174. Descriptions, formats, and examples of the elements of the configuration data 107 are provided in FIGS. 2-4.

In FIG. 2, a table 200 includes a description column 202 and a format column 204. The description column 202 includes examples of descriptions of elements of the configuration data 107. The format column 204 includes examples of formats of the elements of the configuration data 107. For example, the PLR average window duration 162 indicates duration of a sliding average window over which a PLR is to be measured. In a particular aspect, the configuration data 107 indicates the PLR average window duration 162 in milliseconds. In FIG. 3, the codec configuration list 164 includes codec configurations 302-312, the high PLR threshold list 166 includes high PLR thresholds 324-332, the low PLR threshold list 168 includes low PLR thresholds 342-350, the high PLR adaptation request type list 172 includes high PLR adaptation request types 364-372, and the low PLR adaptation request type list 174 includes low PLR adaptation request types 382-390.

The codec configuration list 164 includes an ordered sequence (e.g., an ordered list) of codec configurations. In a particular aspect, the ordered list includes codec configurations supported for a particular media type (e.g., audio or video). In a particular aspect, a codec configuration includes a type of codec, a codec mode, an application layer redundancy level (e.g., 0% to 300%), or a combination thereof. In a particular example, the codec configurations include one or more of adaptive multi-rate wideband (AMR-WB) codec configuration, AMR-WB/G.718 interoperable (IO) codec configuration, enhanced voice services (EVS) AMR-WB IO codec configuration, EVS wideband (WB), super-wideband (SWB) codec configuration, or EVS WB, SWB channel aware codec configuration.

In a particular aspect, the codec configuration list 164 is ordered based on robustness of the codec configurations to packet loss. For example, the EVS WB, SWB channel aware codec configuration, the EVS WB, SWB codec configuration, the EVS AMR-WB IO codec configuration, and the AMR-WB codec configuration have a first order position, a second order position, a third order position, and a fourth order position, respectively, in the codec configuration list 164. In a particular aspect, the codec configuration list 164 is ordered based on a decreasing robustness, increasing quality, decreasing power consumption, decreasing bandwidth usage, or a combination thereof. For example, the first order position (e.g., 0) of the EVS WB, SWB channel aware codec configuration is lower than (e.g., less than) the second order position (e.g., 1) of the EVS WB, SWB codec configuration indicating that the EVS WB, SWB channel aware codec configuration is more robust to packet loss as compared to the EVS WB, SWB (e.g., non-channel aware) codec configuration. For example, the EVS WB, SWB channel aware codec configuration is associated with a first maximum supported end-to-end PLR (e.g., 9%) that is higher than a second maximum supported end-to-end PLR (e.g., 6%) associated with the EVS WB, SWB codec configuration. In a particular aspect, the EVS WB, SWB (e.g., non-channel aware) codec configuration corresponds to higher media quality, lower bandwidth consumption, lower power consumption, or a combination thereof, as compared to the EVS WB, SWB channel aware codec configuration.

The high PLR threshold list 166 indicates first PLR thresholds associated with the codec configurations included in the codec configuration list 164. In a particular example, the first PLR thresholds indicate PLR values at or above which a codec configuration of a higher robustness (or a lower order position) is to be requested. In a particular aspect, each codec configuration (except a codec configuration in the first order position) is associated with a first PLR threshold in the high PLR threshold list 166. For example (as illustrated in FIG. 3), the high PLR threshold list 166 includes a high PLR threshold 324 associated with a codec configuration 304 of the codec configuration list 164. The high PLR threshold list 166 does not include any high PLR threshold associated with a codec configuration 302 that has a first order position (e.g., is the most robust supported codec configuration) in the codec configuration list 164.

The high PLR adaptation request type list 172 indicates high PLR adaptation request types associated with the high PLR thresholds included in the high PLR threshold list 166. In a particular example, the high PLR adaptation request types indicate a type of request to be sent when a corresponding high PLR threshold is satisfied. For example, the high PLR adaptation request type list 172 includes a high PLR adaptation request type 364 associated with the high PLR threshold 324 indicating that a request of the high PLR adaptation request type 364 is to be sent in response to determining that a PLR satisfies the high PLR threshold 324. In a particular example, the codec configuration 302 includes the EVS WB, SWB channel aware codec configuration, the codec configuration 304 includes the EVS WB, SWB codec configuration, and the high PLR adaptation request type 364 is associated with the high PLR threshold 324 of the EVS WB, SWB codec configuration (e.g., the codec configuration 304). In this example, the high PLR adaptation request type 364 indicates a change to EVS WB, SWB channel aware codec configuration request type. In another example, the high PLR adaptation request type 364 indicates a change to a particular application layer redundancy level (e.g., 200%) or a particular change to an application layer redundancy level (e.g., increase by 50%).

The low PLR threshold list 168 indicates second PLR thresholds associated with the codec configurations included in the codec configuration list 164. In a particular example, the second PLR thresholds indicate PLR values at or below which a codec configuration of a lower robustness (or a higher order position) is to be requested. In a particular aspect, the codec with the lower robustness may support higher media quality, lower bandwidth consumption, lower power consumption, or a combination thereof. In a particular aspect, each codec configuration (except a codec configuration in a highest order position) is associated with a second PLR threshold in the low PLR threshold list 168. For example, the low PLR threshold list 168 includes a low PLR threshold 342 associated with the codec configuration 302 of the codec configuration list 164. The low PLR threshold list 168 does not include any low PLR threshold associated with a codec configuration 312 that has a last order position (e.g., is the least robust supported codec configuration) in the codec configuration list 164.

The low PLR adaptation request type list 174 indicates low PLR adaptation request types associated with the low PLR thresholds included in the low PLR threshold list 168. In a particular example, the low PLR adaptation request types indicate a type of request to be sent when a corresponding low PLR threshold is satisfied. For example, the low PLR adaptation request type list 174 includes a low PLR adaptation request type 382 associated with the low PLR threshold 342 indicating that a request of the low PLR adaptation request type 382 is to be sent in response to determining that a PLR satisfies the low PLR threshold 342.

Figure 4:
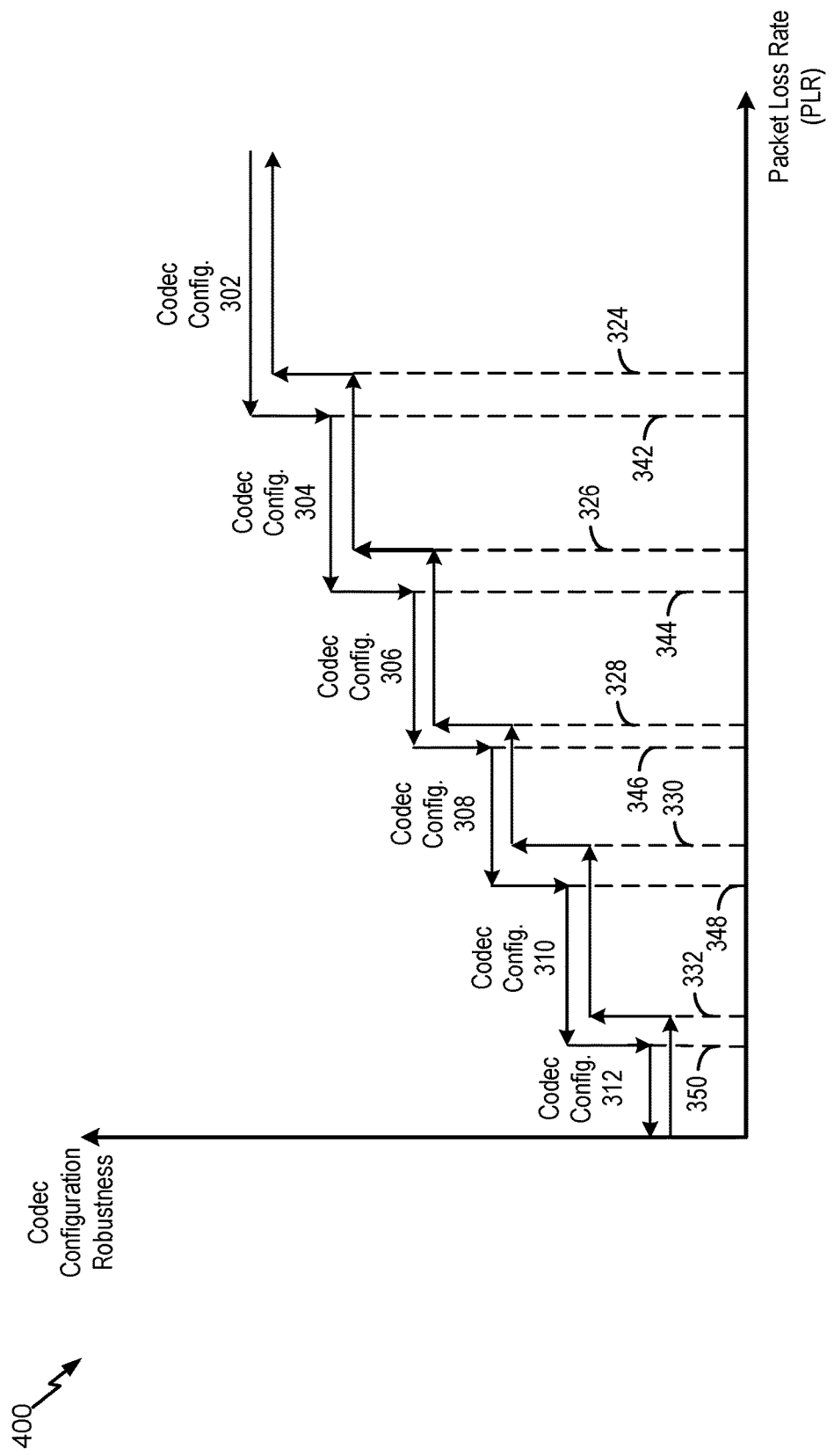
FIG. 4 is a graph of an illustrative example of codec configuration adaptation that may be performed by the system of FIG. 1.

In FIG. 4, a graph 400 has a horizontal axis (e.g., x-axis) that corresponds to increasing PLR values and a vertical axis (e.g., y-axis) that corresponds to increasing robustness (or decreasing order positions) of codec configurations. The graph 400 illustrates examples of PLR thresholds corresponding to various codec configurations. In FIG. 4, a low PLR threshold (e.g., the low PLR threshold 342) of a codec configuration (e.g., the codec configuration 302) is lower than a high PLR threshold (e.g., the high PLR threshold 324) of a next less robust codec configuration (e.g., the codec configuration 304). Having the low PLR threshold of the codec configuration lower than the high PLR threshold of the next less robust codec configuration reduces a likelihood of oscillation between the codec configuration and the next codec configuration for small fluctuations in the PLR 129. In another implementation, the low PLR threshold of a codec configuration is the same as a high PLR threshold of the next less robust codec configuration.

Returning to FIG. 1, the configuration server 142 sends the configuration data 107 to the device 102, the device 122, or both. For example, the configuration server 142 sends the configuration data 107 to the device 122 in response to detecting that the device 122 has entered a coverage area of the network 150. In another example, the configuration server 142 sends the configuration data 107 to the device 122 in response to receiving a request from the device 122.

In a particular aspect, the device 122 establishes a session (e.g., a data communication session) with the device 102. For example, the device 102 and the device 122 exchange negotiation messages indicating supported codecs at each device. To illustrate, the device 102 sends a first negotiation message to the device 122 and the device 122 sends a second negotiation message. The first negotiation message indicates one or more first codec configurations supported by the codec 140 of the device 102. The second negotiation message indicates one or more second codec configurations supported by the codec 130 of the device 122. The device 102 and the device 122 may use various negotiation techniques to select a first codec configuration supported by each of the codecs 130 and 140. The codec configuration adaptation circuitry 137 sets the codec configuration 116 of the encoder 114 to the first codec configuration. The codec configuration adaptation circuitry 139 sets the codec configuration 136 of the decoder 134 to the first codec configuration.

During the session, the receiver 126 receives one or more packets 152 via the network 150 from the device 102. In a particular example, the encoder 114 encodes the packets 152 based on the first codec configuration indicated by the codec configuration 116. The transmitter 108 transmits the packets 152 via the network 150 to the device 122. In a particular aspect, the packets 152 received by the receiver 126 are a subset of packets transmitted by the transmitter 108. For example, one or more of the transmitted packets are not received due to network issues.

The codec configuration adaptation circuitry 139 determines the PLR 129 associated with a particular duration. The PLR 129 is an indication of how many of the packets transmitted by the device 102 were not received at the device 122, as the packets 152, in time to be used by the device 122.

In a particular implementation, the PLR 129 is determined based on a lost packet (LP) counter. For example, a count of lost packets indicated by the LP counter for the particular duration may be used to calculate the PLR 129. The LP counter may be reset occasionally. Alternately, the LP counter may maintain a count of lost packets associated with a sliding window of the particular duration. The particular duration is indicated by the PLR average window duration 162. The codec configuration adaptation circuitry 139 increments the LP counter when a lost packet is detected. For example, a lost packet may be detected when a particular packet is not available for playout (e.g., is not in a de-jitter buffer) when a time to play out the particular packet is reached.

The codec configuration adaptation circuitry 139 determines that the configuration data 107 indicates that first codec configuration (e.g., the codec configuration 306 indicated by the codec configuration 136) is associated with a high PLR threshold (e.g., the high PLR threshold 326), a low PLR threshold (e.g., the low PLR threshold 346), or both.

The codec configuration adaptation circuitry 139, in response to determining that the PLR 129 satisfies (e.g., is greater than) the high PLR threshold, identifies a next more robust supported codec configuration of the codec configuration list 164. The next more robust supported codec configuration has a lower order position (e.g., second) than an order position (e.g., third) of the first codec configuration (e.g., the codec configuration 306) in the codec configuration list 164, is included in the first codec configurations supported by the codec 140, is included in the second codec configurations supported by the codec 130, either is not associated with any high PLR threshold or is associated with a high PLR threshold that is greater than or equal to the PLR 129, or a combination thereof. In a particular aspect, the first codec configuration includes the codec configuration 306 and the next more robust supported codec configuration includes the codec configuration 304. In a particular example, the codec configuration 304 is skipped because the codec configuration 304 is not supported by the codec 130, the codec configuration 304 is not supported by the codec 140, the PLR 129 is greater than the high PLR threshold 324 associated with the codec configuration 304, or a combination thereof. In this example, the next more robust supported codec configuration includes the codec configuration 302.

The codec configuration adaptation circuitry 139 generates the request 192 in response to determining that the PLR 129 satisfies (e.g., is greater than) the high PLR threshold (e.g., the high PLR threshold 326) associated with the first codec configuration (e.g., the codec configuration 306) and identifying the next more robust supported codec configuration. Alternatively, the codec configuration adaptation circuitry 139, in response to determining that the PLR 129 satisfies (e.g., is greater than) the high PLR threshold (e.g., the high PLR threshold 326) associated with the first codec configuration (e.g., the codec configuration 306) and that the codec configuration list 164 does not include a next more robust supported codec configuration, refrains from generating the request 192.

In a particular aspect, a type of the request 192 indicates that codec configuration is to be changed to a more robust (e.g., or a lower order position) codec configuration. In a particular aspect, the request 192 indicates the identified next more robust supported codec configuration (e.g., the codec configuration 302 or the codec configuration 304). In a particular aspect, the request 192 includes the PLR 129 to enable the codec configuration adaptation circuitry 137 to identify the next more robust supported codec configuration (e.g., the codec configuration 302 or the codec configuration 304) based on the configuration data 107.

In a particular aspect, the type of the request 192 is based on the high PLR adaptation request type list 172. For example, the codec configuration adaptation circuitry 139, in response to determining that the high PLR adaptation request type list 172 indicates that the first codec configuration (e.g., the codec configuration 306) is associated with a first high PLR adaptation request type (e.g., the high PLR adaptation request type 366), generates the request 192 of the first high PLR adaptation request type. The codec configuration adaptation circuitry 139 initiates transmission of the request 192 via the transmitter 128 and the network 150 to the device 102.

In a particular aspect, the codec configuration adaptation circuitry 139, in response to determining that the PLR 129 satisfies (e.g., is less than) the low PLR threshold, identifies a next less robust supported codec configuration of the codec configuration list 164. The next less robust supported codec configuration has an order position (e.g., fourth) that is higher than (e.g., greater than) an order position (e.g., third) of the first codec configuration (e.g., the codec configuration 306) in the codec configuration list 164, is included in the first codec configurations supported by the codec 140, is included in the second codec configurations supported by the codec 130, either is not associated with any low PLR threshold or is associated with a low PLR threshold that is less than or equal to the PLR 129, or a combination thereof. In a particular aspect, the first codec configuration includes the codec configuration 306 and the next less robust supported codec configuration includes the codec configuration 308. In a particular example, the codec configuration 308 is skipped because the codec configuration 308 is not supported by the codec 130, the codec configuration 308 is not supported by the codec 140, the PLR 129 is less than the low PLR threshold 348 associated with the codec configuration 308, or a combination thereof. In this example, the next less robust supported codec configuration includes the codec configuration 310.

The codec configuration adaptation circuitry 139 generates the request 192 in response to determining that the PLR 129 satisfies (e.g., is less than) the low PLR threshold (e.g., the low PLR threshold 346) associated with the first codec configuration (e.g., the codec configuration 306) and identifying the next less robust supported codec configuration. Alternatively, the codec configuration adaptation circuitry 139, in response to determining that the PLR 129 satisfies (e.g., is less than) the low PLR threshold (e.g., the low PLR threshold 346) associated with the first codec configuration (e.g., the codec configuration 306) and that the codec configuration list 164 does not include a next less robust supported codec configuration, refrains from generating the request 192.

In a particular aspect, a type of the request 192 indicates that codec configuration is to be changed to a less robust (or a higher order position) codec configuration. In a particular aspect, the request 192 indicates the identified next less robust supported codec configuration (e.g., the codec configuration 308 or the codec configuration 310). In a particular aspect, the request 192 includes the PLR 129 to enable the codec configuration adaptation circuitry 137 to identify the next less robust supported codec configuration (e.g., the codec configuration 308 or the codec configuration 310) based on the configuration data 107.

In a particular aspect, the type of the request 192 is based on the low PLR adaptation request type list 174. For example, the codec configuration adaptation circuitry 139, in response to determining that the low PLR adaptation request type list 174 indicates that the first codec configuration (e.g., the codec configuration 306) is associated with a first low PLR adaptation request type (e.g., the low PLR adaptation request type 386), generates the request 192 of the first low PLR adaptation request type. The codec configuration adaptation circuitry 139 initiates transmission of the request 192 via the transmitter 128 and the network 150 to the device 102.

At the device 102 that receives the request 192, in response to determining that a type of the request 192 indicates that codec configuration is to be changed to a more robust (or a lower order position) codec configuration and identifying the next more robust supported codec configuration, the codec configuration adaptation circuitry 137 sets the codec configuration 116 of the encoder 114 to the identified next more robust supported codec configuration. Alternatively, the codec configuration adaptation circuitry 137 refrains from updating the codec configuration 116 in response to determining that a type of the request 192 indicates that codec configuration is to be changed to a more robust (or a lower order position) codec configuration and that the codec configuration list 164 does not include any next more robust supported codec configuration relative to the first codec configuration (e.g., indicated by the codec configuration 116).

For example, the receiver 106 receives the request 192 via the network 150 from the device 122. The codec configuration adaptation circuitry 137, in response to receiving the request 192, updates the codec configuration 116 of the encoder 114. In examples in which the PLR 129 is too high, the codec configuration adaptation circuitry 137, in response to determining that a type of the request 192 indicates that codec configuration is to be changed to a more robust (or a lower order position) codec configuration, identifies a next more robust supported codec configuration relative to a first codec configuration (indicated by the codec configuration 116) in the codec configuration list 164. The next more robust supported codec configuration has a lower order position than an order position (e.g., third) of the first codec configuration (e.g., the codec configuration 306) in the codec configuration list 164, is included in the first codec configurations supported by the codec 140, is included in the second codec configurations supported by the codec 130, either is not associated with any high PLR threshold or is associated with a high PLR threshold that is greater than or equal to the PLR 129, or a combination thereof. In a particular aspect, the request 192 does not indicate the PLR 129. In this aspect, the next more robust supported codec configuration has a lower order position than an order position (e.g., third) of the first codec configuration (e.g., the codec configuration 306) in the codec configuration list 164, is included in the first codec configurations supported by the codec 140, is included in the second codec configurations supported by the codec 130, or a combination thereof.

In another example at the device 102, in response to determining that a type of the request 192 indicates that codec configuration is to be changed to a less robust (or a higher order position) codec configuration and identifying the next less robust supported codec configuration, the codec configuration adaptation circuitry 137 sets the codec configuration 116 of the encoder 114 to the identified next less robust supported codec configuration. Alternatively, the codec configuration adaptation circuitry 137 refrains from updating the codec configuration 116 in response to determining that a type of the request 192 indicates that codec configuration is to be changed to a less robust (or a higher order position) codec configuration and that the codec configuration list 164 does not include any next less robust supported codec configuration relative to the first codec configuration (e.g., indicated by the codec configuration 116).

For example, when the PLR 129 is low, the codec configuration adaptation circuitry 137, in response to determining that a type of the request 192 indicates that codec configuration is to be changed to a less robust (or a higher order position) codec configuration, identifies a next less robust supported codec configuration relative to a first codec configuration (indicated by the codec configuration 116) in the codec configuration list 164. The next less robust supported codec configuration has a higher order position than an order position (e.g., third) of the first codec configuration (e.g., the codec configuration 306) in the codec configuration list 164, is included in the first codec configurations supported by the codec 140, is included in the second codec configurations supported by the codec 130, either is not associated with any low PLR threshold or is associated with a low PLR threshold that is less than or equal to the PLR 129, or a combination thereof. In a particular aspect, the request 192 does not indicate the PLR 129. In this aspect, the next less robust supported codec configuration has a higher order position than an order position (e.g., third) of the first codec configuration (e.g., the codec configuration 306) in the codec configuration list 164, is included in the first codec configurations supported by the codec 140, is included in the second codec configurations supported by the codec 130, or a combination thereof.

In other implementations, the request 192 can indicate a particular codec configuration. In such implementations, the codec configuration adaptation circuitry 137, in response to determining that that the particular codec configuration is included in the first codec configurations supported by the codec 140, sets the codec configuration 116 to the particular codec configuration.

After sending the request 192, the receiver 126 at the device 122 receives one or more packets 154 via the network 150 from the device 102. The packets 154 are encoded based on a second codec configuration (e.g., the next more robust supported codec configuration, the next less robust supported codec configuration, or the particular codec configuration). For example, the encoder 114 encodes one or more second packets based on the second codec configuration indicated by the codec configuration 116. The encoder 114 initiates transmission via the transmitter 108 of the one or more second packets. The packets 154 received by the receiver 126 are a subset of the second packets transmitted by the transmitter 108 (e.g., one or more of the second packets may be lost during transmission to the device 122).

The system 100 thus enables the codec configuration 116 of the device 102 to be adapted based on the PLR 129 experienced by the device 122. For example, when the device 122 is experiencing a high PLR (e.g., higher than a threshold PLR), the device 102 and the device 122 can move to a more robust codec configuration. Alternatively, when the device 122 is experiencing a low PLR (e.g., lower than a threshold PLR), the device 102 and the device 122 can move to a codec configuration with a higher media quality, lower bandwidth consumption, lower power consumption, or a combination thereof.

Figure 5:
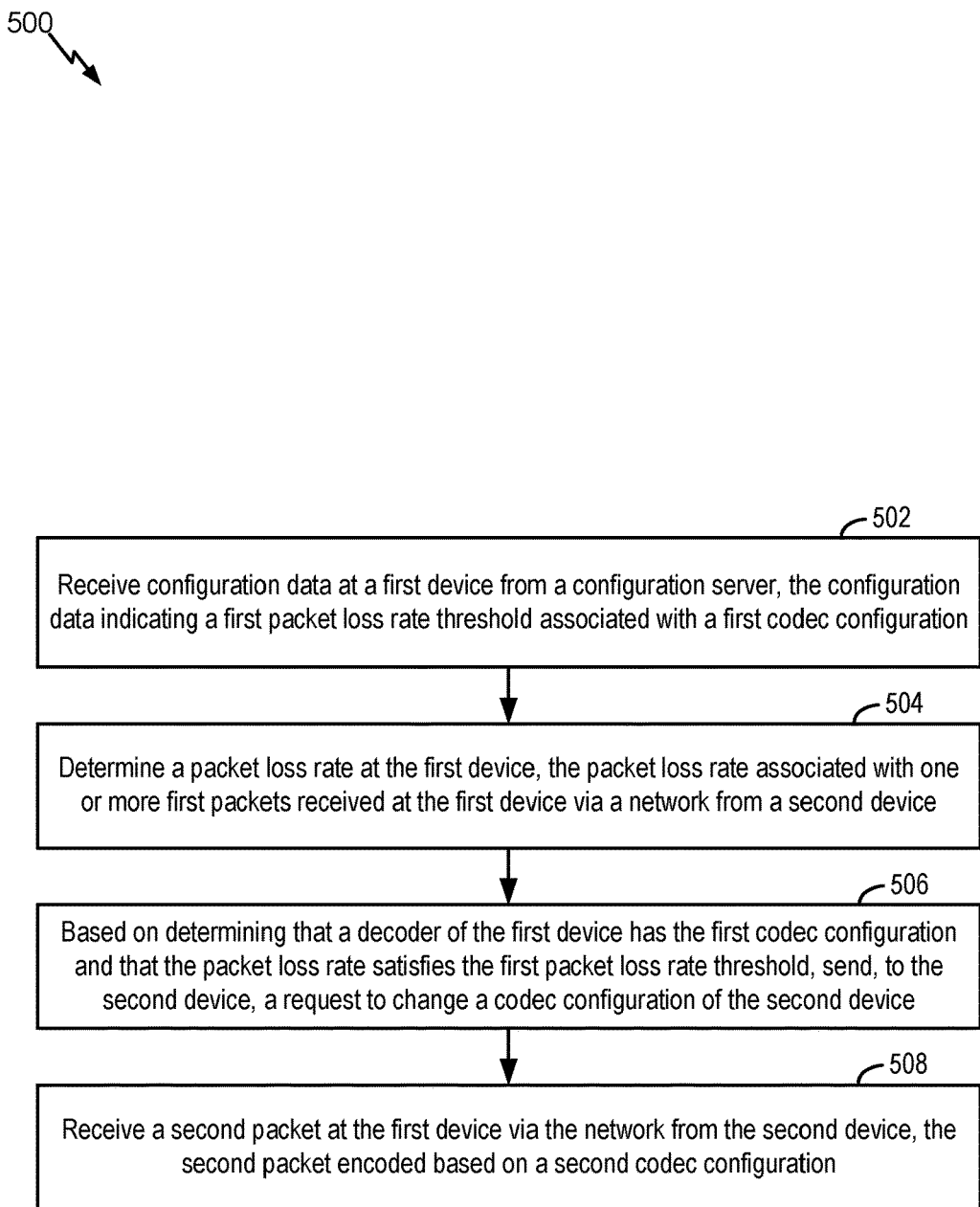
FIG. 5 is a flow chart illustrating a particular method of codec configuration adaptation based on packet loss rate.

Referring to FIG. 5, a method of codec configuration adaptation based on packet loss is shown and generally designated 500. In a particular aspect, one or more operations of the method 500 are performed by the receiver 126, the transmitter 128, the codec configuration adaptation circuitry 139, the device 122, the receiver 106, the transmitter 108, the codec configuration adaptation circuitry 137, the device 102, the system 100 of FIG. 1, or a combination thereof.

The method 500 includes receiving configuration data at a first device from a configuration server, at 502. For example, the receiver 126 of FIG. 1 receives the configuration data 107 from the configuration server 142, as described with reference to FIG. 1. In a particular aspect, the configuration data 107 indicates the high PLR threshold 326 and the low PLR threshold 346 associated with the codec configuration 306, as described with reference to FIG. 3.

The method 500 also includes determining a packet loss rate at the first device, at 504. For example, the codec configuration adaptation circuitry 139 of FIG. 1 determines the PLR 129, as described with reference to FIG. 1. The PLR 129 is associated with the one or more packets 152 received at the device 122 via the network 150 from the device 102.

The method 500 further includes, based on determining that a decoder of the first device has the first codec configuration and that the packet loss rate satisfies the first packet loss rate threshold, sending, to the second device, a request to change a codec configuration of the second device, at 506. For example, the codec configuration adaptation circuitry 139 of FIG. 1, based on determining that the decoder 134 has a first codec configuration (indicated by the codec configuration 136), sends the request 192 to the device 102 to change a codec configuration of the device 102, as described with reference to FIG. 1.

The method 500 also includes receiving a second packet at the first device via the network from the second device, at 508. For example, the receiver 126 receives the one or more packets 154 via the network 150 from the device 102. The packets 154 are encoded based on a second codec configuration (e.g., an updated codec configuration indicated by the codec configuration 116), as described with reference to FIG. 1.

The method 500 thus enables the codec configuration 116 of the device 102 to be adapted based on the PLR 129 experienced by the device 122. For example, when the device 122 is experiencing a high PLR (e.g., higher than a threshold PLR), the device 102 and the device 122 can move to a more robust codec configuration. Alternatively, when the device 122 is experiencing a low PLR (e.g., lower than a threshold PLR), the device 102 and the device 122 can move to codec configuration that is less robust but provides other advantages such as higher media quality, lower bandwidth usage, or power savings.

The components of FIG. 1 are provided as an illustrative example. In other implementations, the system 100 can include fewer or more components than illustrated in FIG. 1. In some examples, one or more of the PLR average window duration 162, the high PLR adaptation request type list 172, or the low PLR adaptation request type list 174 are omitted from the configuration data 107. In some examples, information of the codec configuration list 164, the high PLR threshold list 166, and the low PLR threshold list 168 can be combined, e.g., each entry of the codec configuration list 164 can also indicate a high PLR threshold, a low PLR threshold, or both, for that entry. Although the codec configuration list 164 is illustrated as including six codec configurations, in other implementations the codec configuration list 164 has fewer than six codec configurations (e.g., as few as one or two codec configurations) or has more than six codec configurations (e.g., 7, 10, 50, or any other number of codec configurations).

Figure 6:
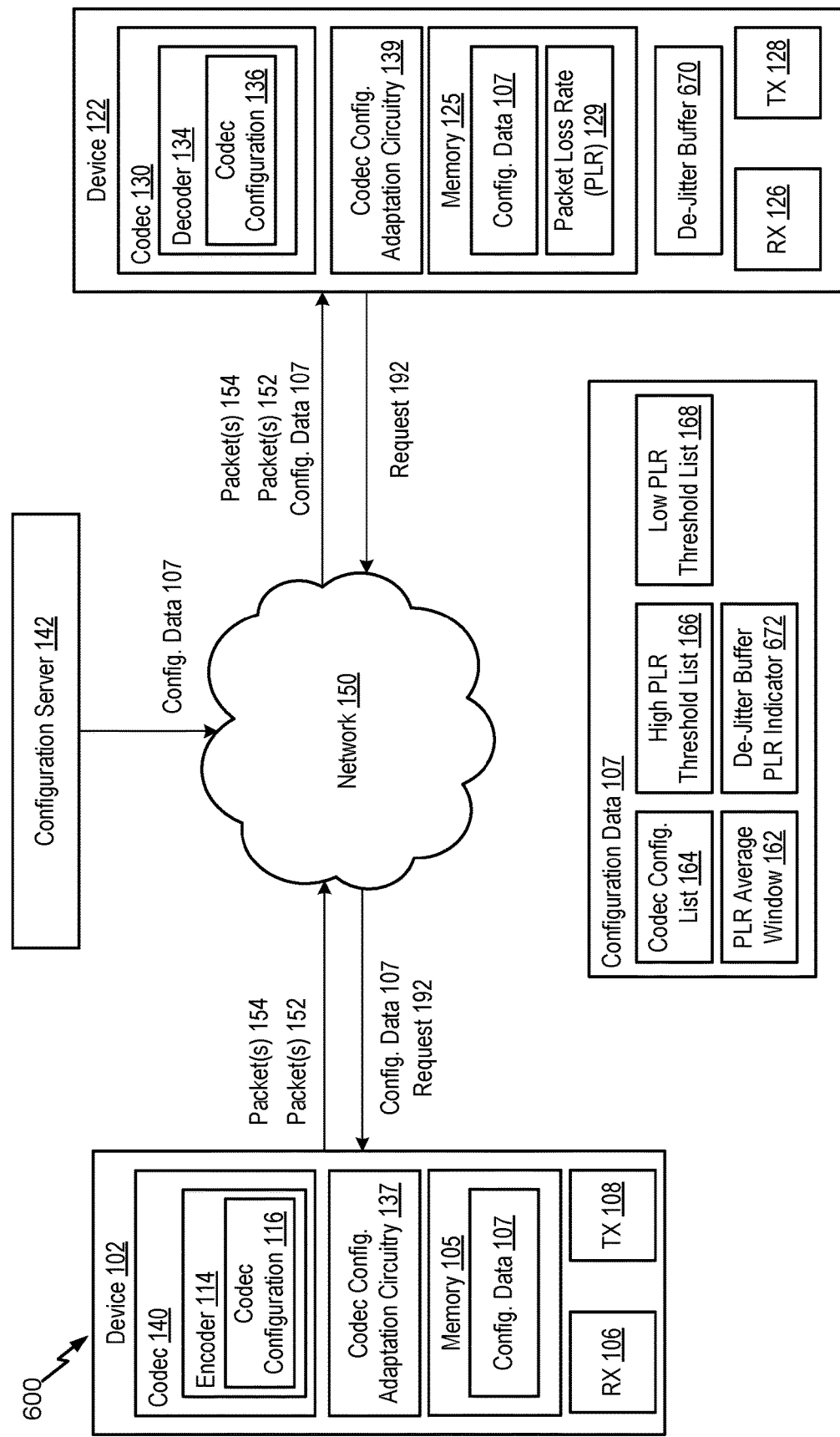
FIG. 6 is a diagram of another example of a system operable to adapt a codec configuration based on packet loss rate.

Referring to FIG. 6, a particular example of a system is disclosed and generally designated 600. As compared to the system 100 of FIG. 1, the system 600 includes a de-jitter buffer 670 and a de-jitter buffer PLR indicator 672. For example, the device 122 includes the de-jitter buffer 670 and the configuration data 107 includes the de-jitter buffer PLR indicator 672. In the example illustrated in FIG. 6, the configuration data 107 does not include the high PLR adaptation request type list 172 and the low PLR adaptation request type list 174. In some other examples, the configuration data 107 includes the de-jitter buffer PLR indicator 672 in addition to the high PLR adaptation request type list 172, the low PLR adaptation request type list 174, or both. Descriptions, formats, and examples of the elements of the configuration data 107 are provided in FIG. 7.

In FIG. 7, a table 700 includes a description column 702 and a format column 704. The description column 702 and the format column 704 differ from the description column 202 and the format column 204 of FIG. 2 in that a description and a format, respectively, of the de-jitter buffer PLR indicator 672 are added. For example, a first value (e.g., 0) of the de-jitter buffer PLR indicator 672 indicates that the PLR estimate (e.g., the PLR 129) for comparing with the thresholds indicated in the high PLR threshold list 166 or the low PLR threshold list 168 is to be measured before the de-jitter buffer. As another example, a second value (e.g., 1) of the de-jitter buffer PLR indicator 672 indicates that the PLR estimate (e.g., the PLR 129) is to be measured after the de-jitter buffer.

Returning to FIG. 6, the codec configuration adaptation circuitry 139 is configured to, responsive to determining that the de-jitter buffer PLR indicator 672 has a first value (e.g., 0), determine the PLR 129 based on a count of pre-de-jitter buffer packet loss events. In a particular aspect, the codec configuration adaptation circuitry 139 detects a pre-de-jitter packet loss event in response to determining that an expected packet has not been received (e.g., has not been received within an expected time) at the device 122. For example, the codec configuration adaptation circuitry 139 determines that the packet(s) 152 include a first packet that is received at a first time at the receiver 126. The codec configuration adaptation circuitry 139 determines that a second packet subsequent to the first packet is expected to be received at the receiver 126. For example, the first packet indicates a first sequence number and the second packet having a second sequence number is expected to be received at the receiver 126. The codec configuration adaptation circuitry 139 detects that an expected packet has not been received within an expected time in response to determining that no packet having the second sequence number has been received at the receiver 126 within a threshold duration of the first time. The codec configuration adaptation circuitry 139 increments the count of pre-de-jitter buffer packet loss events (e.g., indicated by the LP counter) in response to detecting that the expected packet has not been received within the expected time. The PLR 129 is based on a value of the LP counter. In a particular aspect, the PLR 129 is based on a comparison of a first count of the packet(s) 152 received at the device 122 and a value of the LP counter (e.g., PLR 129=LP counter value/(first count+LP counter value)).

In a particular aspect, the codec configuration adaptation circuitry 139 is configured to, responsive to determining that the de-jitter buffer PLR indicator 672 has a second value (e.g., 1), determine the PLR 129 based on a count of post-de-jitter buffer packet loss events. In a particular aspect, the codec configuration adaptation circuitry 139 detects a post-de-jitter buffer packet loss event in response to determining that a particular packet is not available for playout (e.g., is not in the de-jitter buffer 670) when a time to play out the particular packet is reached. The codec configuration adaptation circuitry 139, in response to detecting a post-de-jitter buffer packet loss event, updates a count of the post-de-jitter buffer packet loss events (e.g., indicated by the LP counter). The PLR 129 is based on a value of the LP counter. In a particular aspect, the PLR 129 is based on a comparison of a first count of a subset of the packet(s) 152 available in the de-jitter buffer at corresponding playout times and a value of the LP counter (e.g., PLR 129=LP counter value/(first count+LP counter value)).

In some aspects, a first PLR based on post-de-jitter buffer packet loss events is more representative of user experience as compared to pre-de-jitter buffer packet loss events. For example, a post-de-jitter buffer packet loss event includes a packet that is received at the device 122 subsequent to a playout time of the packet. The packet is not played out (e.g., not added to the de-jitter buffer 670) and not playing out the packet can adversely impact user experience (e.g., reduced audio/voice quality). Codec configuration adaptation using a PLR that is based on post-de-jitter buffer packet loss events, as compared to pre-de-jitter buffer packet loss events, can improve user experience. An operator of a network can use the de-jitter buffer PLR indicator 672 so that various devices of the network use the same metric for codec configuration adaptation and users of the devices have a similar user experience. For example, a first network operator can specify a first value (e.g., 0) of the de-jitter buffer PLR indicator 672 to use a more traditional estimation of the PLR that is based on pre-de-jitter buffer packet loss events (e.g., a count of expected packets not received at a device). A second network operator can specify a second value (e.g., 1) of the de-jitter buffer PLR indicator 672 to use an estimation of the PLR that is based on post-de-jitter buffer packet loss events (e.g., a count of packets that are not available for playout) so that user experience of users of devices in the network is improved.

Figure 8:
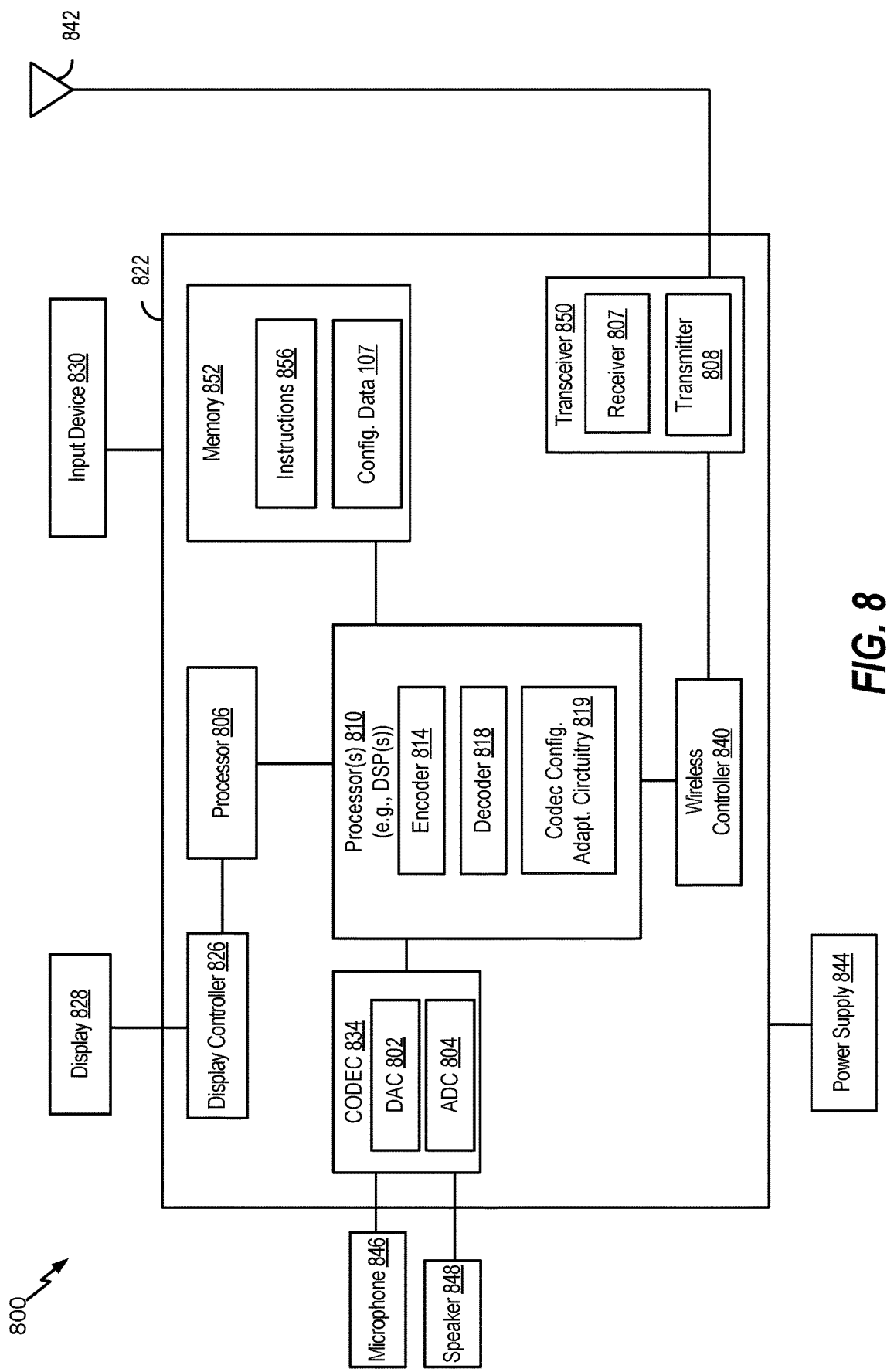
FIG. 8 is a block diagram of a particular illustrative example of a device that is operable to perform codec configuration adaptation based on packet loss rate.

Referring to FIG. 8, a block diagram of a particular illustrative example of a device (e.g., a wireless communication device) is depicted and generally designated 800. In various aspects, the device 800 may have fewer or more components than illustrated in FIG. 8. In an illustrative aspect, the device 800 may correspond to the device 102, the device 122, the configuration server 142 of FIG. 1, or a combination thereof. In an illustrative aspect, the device 800 may perform one or more operations described with reference to systems and methods of FIGS. 1-7.

In a particular aspect, the device 800 includes a processor 806 (e.g., a central processing unit (CPU)). The device 800 may include one or more additional processors 810 (e.g., one or more digital signal processors (DSPs)). The processors 810 may include a decoder 818, an encoder 814, codec configuration adaptation circuitry 819, or a combination thereof. The encoder 814 may include the encoder 114 of FIG. 1. The decoder 818 may include the decoder 134 of FIG. 1. The codec configuration adaptation circuitry 819 may include the codec configuration adaptation circuitry 137, the codec configuration adaptation circuitry 139 of FIG. 1, or both.

The device 800 may include a memory 852 and a CODEC 834. Although the encoder 814, the decoder 818, and the codec configuration adaptation circuitry 819 are illustrated as components of the processors 810 (e.g., dedicated circuitry and/or executable programming code), in other aspects one or more components of the encoder 814, the decoder 818, the codec configuration adaptation circuitry 819, or a combination thereof may be included in the processor 806, the CODEC 834, another processing component, or a combination thereof.

The device 800 may include a transceiver 850 coupled to an antenna 842. The transceiver 850 may include a receiver 807, a transmitter 808, or both. The receiver 807 may include the receiver 106, the receiver 126 of FIG. 1, or both. The transmitter 808 may include the transmitter 108, the transmitter 128 of FIG. 1, or both. The processors 810 are coupled via a wireless controller 840 to the transceiver 850.

The device 800 may include a display 828 coupled to a display controller 826. One or more speakers 848 may be coupled to the CODEC 834. One or more microphones 846 may be coupled, via one or more input interface(s), to the CODEC 834. The CODEC 834 may include a digital-to-analog converter (DAC) 802 and an analog-to-digital converter (ADC) 804.

The memory 852 may include instructions 856 executable by the processor 806, the processors 810, the CODEC 834, another processing unit of the device 800, or a combination thereof, to perform one or more operations described with reference to FIGS. 1-7. The memory 852 may store one or more signals, one or more parameters, one or more thresholds, one or more indicators, or a combination thereof, described with reference to FIGS. 1-7. For example, the memory 852 is configured to store the configuration data 107, the PLR 129 of FIG. 1, or both.

One or more components of the device 800 may be implemented via dedicated hardware (e.g., circuitry), by a processor executing instructions to perform one or more tasks, or a combination thereof. As an example, the memory 852 or one or more components of the processor 806, the processors 810, and/or the CODEC 834 may be a memory device (e.g., a computer-readable storage device), such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include (e.g., store) instructions (e.g., the instructions 856) that, when executed by a computer (e.g., one or more processors, such as a processor in the CODEC 834, the processor 806, and/or the processors 810), may cause the computer to perform one or more operations described with reference to FIGS. 1-7. As an example, the memory 852 or the one or more components of the processor 806, the processors 810, and/or the CODEC 834 may be a non-transitory computer-readable medium that includes instructions (e.g., the instructions 856) that, when executed by a computer (e.g., one or more processors, such as a processor in the CODEC 834, the processor 806, and/or the processors 810), cause the computer to perform one or more operations described with reference to FIGS. 1-7.

In a particular aspect, the device 800 may be included in a system-in-package or system-on-chip device (e.g., a mobile station modem (MSM)) 822. In a particular aspect, the processor 806, the processors 810, the display controller 826, the memory 852, the CODEC 834, and the transceiver 850 are included in a system-in-package or the system-on-chip device 822. In a particular aspect, an input device 830, such as a touchscreen and/or keypad, and a power supply 844 are coupled to the system-on-chip device 822. Moreover, in a particular aspect, as illustrated in FIG. 8, the display 828, the input device 830, the speaker 848, the microphone 846, the antenna 842, and the power supply 844 are external to the system-on-chip device 822. However, each of the display 828, the input device 830, the speaker 848, the microphone 846, the antenna 842, and the power supply 844 can be coupled to a component of the system-on-chip device 822, such as an interface or a controller.

The device 800 may include a wireless telephone, a mobile communication device, a mobile device, a mobile phone, a smart phone, a cellular phone, a virtual reality headset, an augmented reality headset, a vehicle (e.g., a car), a laptop computer, a desktop computer, a computer, a tablet computer, a set top box, a personal digital assistant (PDA), a display device, a television, a gaming console, a music player, a radio, a video player, an entertainment unit, a communication device, a fixed location data unit, a personal media player, a digital video player, a digital video disc (DVD) player, a tuner, a camera, a navigation device, a decoder system, an encoder system, or any combination thereof.

In a particular aspect, one or more components of the systems described with reference to FIGS. 1-7 and the device 800 may be integrated into a decoding system or apparatus (e.g., an electronic device, a CODEC, or a processor therein), into an encoding system or apparatus, or both. In other aspects, one or more components of the systems described with reference to FIGS. 1-7 and the device 800 may be integrated into a mobile device, a wireless telephone, a tablet computer, a desktop computer, a virtual reality headset, an augmented reality headset, a vehicle (e.g., a car), a laptop computer, a set top box, a music player, a video player, an entertainment unit, a television, a game console, a navigation device, a communication device, a personal digital assistant (PDA), a fixed location data unit, a personal media player, or another type of device.

It should be noted that various functions performed by the one or more components of the systems described with reference to FIGS. 1-7 and the device 800 are described as being performed by certain components or modules. This division of components and modules is for illustration only. In an alternate aspect, a function performed by a particular component or module may be divided amongst multiple components or modules. Moreover, in an alternate aspect, two or more components or modules described with reference to FIGS. 1-7 may be integrated into a single component or module. Each component or module described with reference to FIGS. 1-7 may be implemented using hardware (e.g., a field-programmable gate array (FPGA) device, an application-specific integrated circuit (ASIC), a DSP, a controller, etc.), software (e.g., instructions executable by a processor), or any combination thereof.

In conjunction with the described aspects, an apparatus includes means for receiving configuration data at a first device from a configuration server. For example, the means for receiving the configuration data may include the receiver 126, the receiver 106 of FIG. 1, the receiver 807, the transceiver 850 of FIG. 8, one or more structures, devices, or circuits configured to receive configuration data at a first device from a configuration server, or a combination thereof. The configuration data indicates a first packet loss rate threshold associated with a first codec configuration.

The apparatus also includes means for determining a packet loss rate at the first device. For example, the means for determining the packet loss rate may include the codec configuration adaptation circuitry 137, the codec configuration adaptation circuitry 139, the device 102, the device 122 of FIG. 1, the processor(s) 810, the codec configuration adaptation circuitry 819 of FIG. 8, one or more structures, devices, or circuits configured to determine a packet loss rate at the first device, or a combination thereof. The packet loss rate is associated with one or more first packets received at the first device via a network from a second device. For example, the packet loss rate is associated with a comparison of a count of the first packets and a count of second packets that are expected and not received at the first device. As another example, the packet loss rate is associated with a count of a subset of the first packets that are available in a de-jitter buffer at corresponding playout times and a count of second packets that are not available in the de-jitter buffer at corresponding playout times.

The apparatus further includes means for sending a request to the second device to change a codec configuration of the second device. For example, the means for sending the request may include the transmitter 108, the transmitter 128 of FIG. 1, the transmitter 808, the transceiver 850 of FIG. 8, one or more structures, devices, or circuits configured to send a request to change a codec configuration to the second device based on determining that a decoder of the first device has the first codec configuration and that the packet loss rate satisfies the first packet loss threshold, or a combination thereof. The request is sent based on determining that a decoder of the first device has the first codec configuration and that the packet loss rate satisfies the first packet loss rate threshold.

Figure 9:
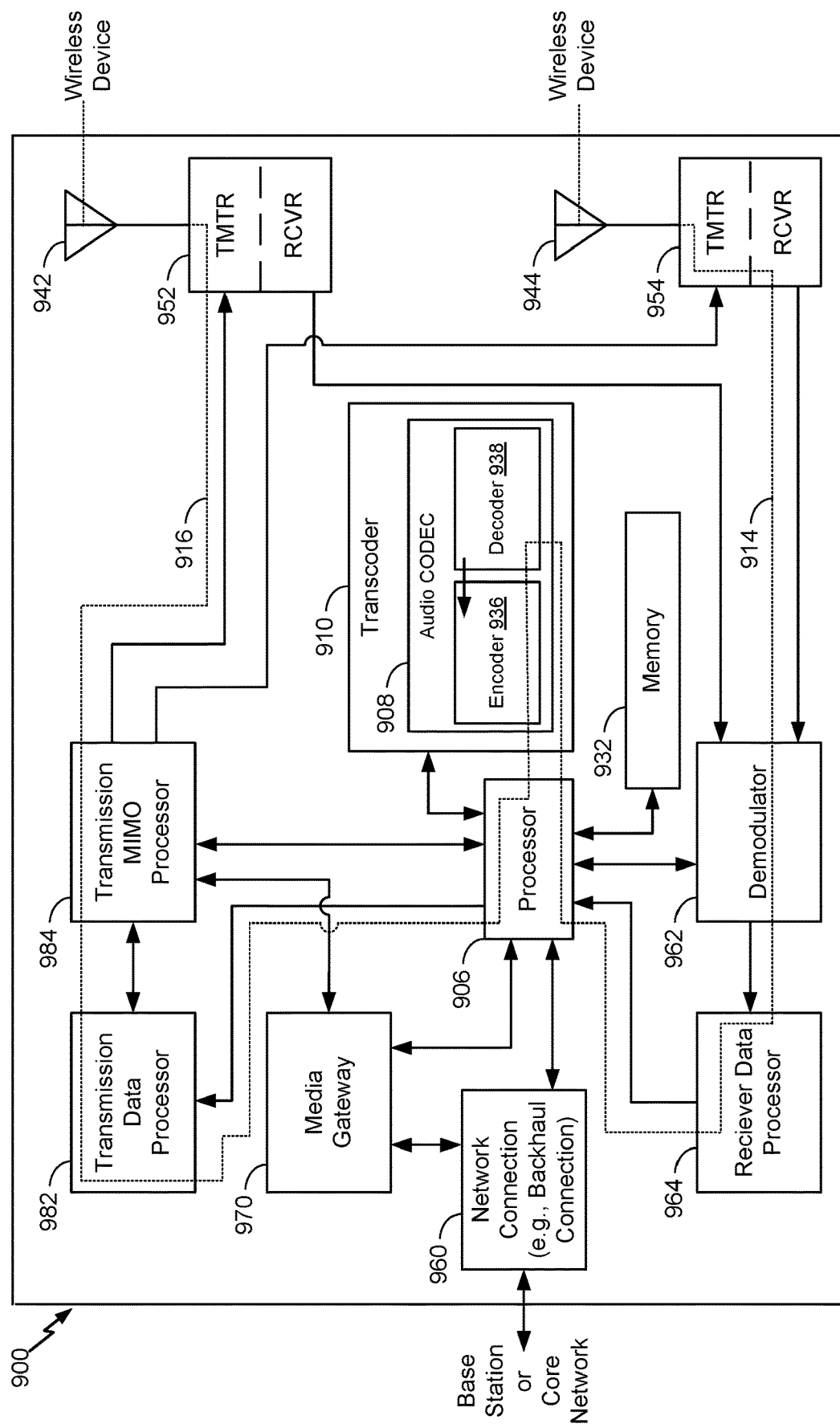
FIG. 9 is a block diagram of a base station that is operable to perform codec configuration adaptation based on packet loss rate.

The apparatus also includes means for receiving a second packet at the first device via the network from the second device. For example, the means for receiving the second packet may include the receiver 126, the receiver 106 of FIG. 1, the receiver 807, the transceiver 850 of FIG. 8, one or more structures, devices, or circuits configured to receive a second packet at the first device via the network from the second device, or a combination thereof. The second packet is encoded based on a second codec configuration Referring to FIG. 9, a block diagram of a particular illustrative example of a base station 900 is depicted. In various implementations, the base station 900 may have more components or fewer components than illustrated in FIG. 9. In an illustrative example, the base station 900 may include the device 102, the device 122, the configuration server 142 of FIG. 1, or a combination thereof. In an illustrative example, the base station 900 may perform one or more operations described with reference to FIGS. 1-7.

The base station 900 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 800 of FIG. 8.

Various functions may be performed by one or more components of the base station 900 (and/or in other components not shown), such as sending and receiving messages and data (e.g., audio data). In a particular example, the base station 900 includes a processor 906 (e.g., a CPU). In a particular aspect, the processor 906 includes multiple processors. The base station 900 may include a transcoder 910. The transcoder 910 may include an audio CODEC 908. For example, the transcoder 910 may include one or more components (e.g., circuitry) configured to perform operations of the audio CODEC 908. As another example, the transcoder 910 may be configured to execute one or more computer-readable instructions to perform the operations of the audio CODEC 908. Although the audio CODEC 908 is illustrated as a component of the transcoder 910, in other examples one or more components of the audio CODEC 908 may be included in the processor 906, another processing component, or a combination thereof. For example, a decoder 938 (e.g., a vocoder decoder) may be included in a receiver data processor 964. As another example, an encoder 936 (e.g., a vocoder encoder) may be included in a transmission data processor 982.

The transcoder 910 may function to transcode messages and data between two or more networks. The transcoder 910 may be configured to convert message and audio data from a first format (e.g., a digital format) to a second format. To illustrate, the decoder 938 may decode encoded signals having a first format and the encoder 936 may encode the decoded signals into encoded signals having a second format. Additionally or alternatively, the transcoder 910 may be configured to perform data rate adaptation. For example, the transcoder 910 may downconvert a data rate or upconvert the data rate without changing a format the audio data. To illustrate, the transcoder 910 may downconvert 64 kbit/s signals into 16 kbit/s signals.

In a particular aspect, the transcoder 910 is configured to perform codec configuration adaptation. For example, the transcoder 910 includes the codec configuration adaptation circuitry 137, the codec configuration adaptation circuitry 139 of FIG. 1, or both. The audio CODEC 908 may include the encoder 936 and the decoder 938. The encoder 936 may include the encoder 114 of FIG. 1. The decoder 938 may include the decoder 134 of FIG. 1.

The base station 900 may include a memory 932. The memory 932, such as a computer-readable storage device, may include instructions. The instructions may include one or more instructions that are executable by the processor 906, the transcoder 910, or a combination thereof, to perform one or more operations described with reference to FIGS. 1-7. In a particular aspect, the memory 932 is configured to store the configuration data 107, the PLR 129 of FIG. 1, or both. The base station 900 may include multiple transmitters and receivers (e.g., transceivers), such as a first transceiver 952 and a second transceiver 954, coupled to an array of antennas. The array of antennas may include a first antenna 942 and a second antenna 944. The array of antennas may be configured to wirelessly communicate with one or more wireless devices, such as the device 800 of FIG. 8. For example, the second antenna 944 may receive a data stream 914 (e.g., a bit stream) from a wireless device. The data stream 914 may include messages, data (e.g., encoded speech data), or a combination thereof.

The base station 900 may include a network connection 960, such as backhaul connection. The network connection 960 may be configured to communicate with a core network or one or more base stations of the wireless communication network. For example, the base station 900 may receive a second data stream (e.g., messages or audio data) from a core network via the network connection 960. The base station 900 may process the second data stream to generate messages or audio data and provide the messages or the audio data to one or more wireless device via one or more antennas of the array of antennas or to another base station via the network connection 960. In a particular implementation, the network connection 960 may be a wide area network (WAN) connection, as an illustrative, non-limiting example. In some implementations, the core network may include or correspond to a Public Switched Telephone Network (PSTN), a packet backbone network, or both.

The base station 900 may include a media gateway 970 that is coupled to the network connection 960 and the processor 906. The media gateway 970 may be configured to convert between media streams of different telecommunications technologies. For example, the media gateway 970 may convert between different transmission protocols, different coding schemes, or both. To illustrate, the media gateway 970 may convert from PCM signals to Real-Time Transport Protocol (RTP) signals, as an illustrative, non-limiting example. The media gateway 970 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 970 may include a transcoder, such as the transcoder 910, and may be configured to transcode data when codecs are incompatible. For example, the media gateway 970 may transcode between an Adaptive Multi-Rate (AMR) codec and a G.711 codec, as an illustrative, non-limiting example. The media gateway 970 may include a router and a plurality of physical interfaces. In some implementations, the media gateway 970 may also include a controller (not shown). In a particular implementation, the media gateway controller may be external to the media gateway 970, external to the base station 900, or both. The media gateway controller may control and coordinate operations of multiple media gateways. The media gateway 970 may receive control signals from the media gateway controller and may function to bridge between different transmission technologies and may add service to end-user capabilities and connections.

The base station 900 may include a demodulator 962 that is coupled to the transceivers 952, 954, the receiver data processor 964, and the processor 906, and the receiver data processor 964 may be coupled to the processor 906. The demodulator 962 may be configured to demodulate modulated signals received from the transceivers 952, 954 and to provide demodulated data to the receiver data processor 964. The receiver data processor 964 may be configured to extract a message or audio data from the demodulated data and send the message or the audio data to the processor 906.

The base station 900 may include a transmission data processor 982 and a transmission multiple input-multiple output (MIMO) processor 984. The transmission data processor 982 may be coupled to the processor 906 and the transmission MIMO processor 984. The transmission MIMO processor 984 may be coupled to the transceivers 952, 954 and the processor 906. In some implementations, the transmission MIMO processor 984 may be coupled to the media gateway 970. The transmission data processor 982 may be configured to receive the messages or the audio data from the processor 906 and to code the messages or the audio data based on a coding scheme, such as CDMA or orthogonal frequency-division multiplexing (OFDM), as an illustrative, non-limiting examples. The transmission data processor 982 may provide the coded data to the transmission MIMO processor 984.

The coded data may be multiplexed with other data, such as pilot data, using CDMA or OFDM techniques to generate multiplexed data. The multiplexed data may then be modulated (i.e., symbol mapped) by the transmission data processor 982 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 906.

The transmission MIMO processor 984 may be configured to receive the modulation symbols from the transmission data processor 982 and may further process the modulation symbols and may perform beamforming on the data. For example, the transmission MIMO processor 984 may apply beamforming weights to the modulation symbols. The beamforming weights may correspond to one or more antennas of the array of antennas from which the modulation symbols are transmitted.

During operation, the second antenna 944 of the base station 900 may receive a data stream 914. The second transceiver 954 may receive the data stream 914 from the second antenna 944 and may provide the data stream 914 to the demodulator 962. The demodulator 962 may demodulate modulated signals of the data stream 914 and provide demodulated data to the receiver data processor 964. The receiver data processor 964 may extract audio data from the demodulated data and provide the extracted audio data to the processor 906.

The processor 906 may provide the audio data to the transcoder 910 for transcoding. The decoder 938 of the transcoder 910 may decode the audio data from a first format into decoded audio data and the encoder 936 may encode the decoded audio data into a second format. In some implementations, the encoder 936 may encode the audio data using a higher data rate (e.g., upconvert) or a lower data rate (e.g., downconvert) than received from the wireless device. In other implementations the audio data may not be transcoded. Although transcoding (e.g., decoding and encoding) is illustrated as being performed by a transcoder 910, the transcoding operations (e.g., decoding and encoding) may be performed by multiple components of the base station 900. For example, decoding may be performed by the receiver data processor 964 and encoding may be performed by the transmission data processor 982. In other implementations, the processor 906 may provide the audio data to the media gateway 970 for conversion to another transmission protocol, coding scheme, or both. The media gateway 970 may provide the converted data to another base station or core network via the network connection 960.

In a particular aspect, the transcoder 910, in response to receiving the request 192 of FIG. 1, updates a codec configuration of the encoder 936. The encoder 936 may generate encoded audio data based on the updated codec configuration. Encoded audio data generated at the encoder 936, such as transcoded data, may be provided to the transmission data processor 982 or the network connection 960 via the processor 906.

The transcoded audio data from the transcoder 910 may be provided to the transmission data processor 982 for coding according to a modulation scheme, such as OFDM, to generate the modulation symbols. The transmission data processor 982 may provide the modulation symbols to the transmission MIMO processor 984 for further processing and beamforming. The transmission MIMO processor 984 may apply beamforming weights and may provide the modulation symbols to one or more antennas of the array of antennas, such as the first antenna 942 via the first transceiver 952. Thus, the base station 900 may provide a transcoded data stream 916, which corresponds to the data stream 914 received from the wireless device, to another wireless device. The transcoded data stream 916 may have a different encoding format, data rate, or both, than the data stream 914. In other implementations, the transcoded data stream 916 may be provided to the network connection 960 for transmission to another base station or a core network.

The base station 900 may therefore include a computer-readable storage medium (e.g., the memory 932) storing instructions that, when executed by one or more processors (e.g., the processor 906, the transcoder 910, or both), cause the processors to perform operations for communication. The operations including receiving configuration data from a configuration server. The configuration data indicates a first packet loss rate threshold associated with a first codec configuration. The operations include determining a packet loss rate associated with one or more first packets received at the base station 900 via a network from a second device. The operations include, based on determining that a decoder of the base station 900 has the first codec configuration and that the packet loss rate satisfies the first packet loss threshold, sending, to the second device, a request to change a codec configuration of the second device. The operations also include receiving a second packet via the network from the second device. The second packet is encoded based on a second codec configuration.

An example of details of describing the codec configuration is provided. In a particular implementation, a global list per media type is used. The global list ranks examples of codec configurations for a media type in order of robustness. If a subset of the codecs or configurations is negotiated for the session, the terminals adapt between the negotiated subset using the same robustness ordering from the global list. Each entry of the global list includes a codec name field (e.g., MIME Type), codec rate field (e.g., in bits/second), a redundancy field, or a combination thereof. The following fields can be used for each entry in the global list:

| Codec Name (e.g., MIME Type) | Codec Rate (in bits/sec) | Redundancy | |
|---|---|---|---|
| | | Value | Meaning |
| | | 0 | No redundancy |
| | | P | Partial Redundancy |
| | | FEC1 | Forward Error Correcting Code 1 |
| | | FEC2 | Forward Error Correcting Code 2 |
| | | FEC3 | Forward Error Correcting Code 3 |
| | | 1 | 100% repetition application layer redundancy |
| | | 2 | 200% repetition application layer redundancy |
| | | 3 | 300% repetition application layer redundancy |

In a particular implementation, a list per codec type is used. The list per codec type ranks examples of codec configurations for a particular codec type in order of robustness. If a subset of the configurations of the codecs is negotiated for the session, the terminals adapt between the negotiated subset using the same robustness ordering from the list per codec type. The following fields can be used for each entry in the list that is specific to a codec type.

| For Codec 1: | | |
|---|---|---|
| Codec Rate | Redundancy | |
| (in bits/sec) | Value | Meaning |
| | 0 | No redundancy |
| | P | Partial Redundancy |
| | FEC1 | Forward Error Correcting Code 1 |
| | FEC2 | Forward Error Correcting Code 2 |
| | FEC3 | Forward Error Correcting Code 3 |
| | 1 | 100% repetition application layer redundancy |
| | 2 | 200% repetition application layer redundancy |
| | 3 | 300% repetition application layer redundancy |
| | 4 | 400% repetition application layer redundancy |

| For Codec 2: | | |
|---|---|---|
| Codec Rate | Redundancy | |
| (in bits/sec) | Value | Meaning |
| | 0 | No redundancy |
| | P | Partial Redundancy |
| | FEC1 | Forward Error Correcting Code 1 |
| | FEC2 | Forward Error Correcting Code 2 |
| | FEC3 | Forward Error Correcting Code 3 |
| | 1 | 100% repetition application layer redundancy |
| | 2 | 200% repetition application layer redundancy |
| | 3 | 300% repetition application layer redundancy |
| | 4 | 400% repetition application layer redundancy |

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
one or more processors configured to:
determine a packet loss rate at a first device, the packet loss rate associated with one or more first packets encoded by a decoder based on a first codec configuration and received at the first device from a second device; and
based on a determination that the packet loss rate satisfies a first packet loss rate threshold and that a second codec configuration is available to the first device, send, to the second device, a request to receive packets from the second device based on a second codec configuration.

2. The device of claim 1, further comprising:
the decoder; and
a receiver configured to receive configuration data, wherein the configuration data includes an ordered list of codec configurations, and wherein the first codec configuration has a first order position and the second codec configuration has a second order position in the ordered list of codec configurations.

3. The device of claim 1, wherein the one or more processors are integrated into a mobile device.

4. The device of claim 1, wherein the one or more processors are integrated into a base station.

5. A method of communication comprising:
determining a packet loss rate at a first device, the packet loss rate associated with one or more first packets encoded based on a first codec configuration and received at the first device from a second device; and
based on determining that the packet loss rate satisfies a first packet loss rate threshold and that a second codec configuration is available to the first device, sending, to the second device, a request to receive packets from the second device based on a second codec configuration.

6. The method of claim 5, further comprising obtaining the first packet loss rate threshold from configuration data, wherein the configuration data includes an ordered list of codec configurations, and wherein the first codec configuration has a first order position and the second codec configuration has a second order position in the ordered list of codec configurations.

7. The method of claim 6, wherein the ordered list of codec configurations is ordered based on robustness of the codec configurations to packet loss.

8. The method of claim 6, wherein the configuration data includes a list of first packet loss rate thresholds associated with the ordered list of codec configurations, and wherein a first high packet loss rate threshold of the first packet loss rate thresholds is associated with the first codec configuration.

9. The method of claim 8, further comprising determining that the packet loss rate satisfies the first packet loss rate threshold in response to determining that the packet loss rate is greater than the first high packet loss rate threshold.

10. The method of claim 9, wherein the configuration data includes a list of first request types associated with the list of first packet loss rate thresholds, wherein a first request type of the first request types is associated with the first high packet loss rate threshold, and wherein the request is of the first request type.

11. The method of claim 6, wherein the configuration data includes a list of second packet loss rate thresholds associated with the ordered list of codec configurations, and wherein a first low packet loss rate threshold of the second packet loss rate thresholds is associated with the first codec configuration.

12. The method of claim 11, further comprising determining that the packet loss rate satisfies the first packet loss rate threshold in response to determining that the packet loss rate is less than the first low packet loss rate threshold.

13. The method of claim 12, wherein the configuration data includes a list of second request types associated with the list of second packet loss rate thresholds, wherein a second request type of the second request types is associated with the first low packet loss rate threshold, and wherein the request is of the second request type.

14. The method of claim 6, wherein the configuration data indicates an ordered sequence of codec configurations, and further comprising, prior to sending the request to the second device:
- receiving a message from the second device indicating one or more codec configurations supported by the second device; and
- generating the request indicating the second codec configuration based on determining that the second codec configuration has a second order position that is greater than a first order position of the first codec configuration in the ordered sequence of codec configurations, that the one or more codec configurations supported by the second device include the second codec configuration, and that the first device supports the second codec configuration.

15. The method of claim 6, wherein the configuration data includes a packet loss rate average window duration, and wherein the packet loss rate is based on a sliding window of the packet loss rate average window duration.

16. The method of claim 6, wherein the configuration data includes a de-jitter buffer packet loss rate indicator, and wherein, responsive to determining that the de-jitter buffer packet loss rate indicator has a first value, the packet loss rate is based on a count of pre-de-jitter buffer packet loss events.

17. The method of claim 6, wherein the configuration data includes a de-jitter buffer packet loss rate indicator, and wherein, responsive to determining that the de-jitter buffer packet loss rate indicator has a second value, the packet loss rate is based on a count of post-de-jitter buffer packet loss events.

18. The method of claim 5, wherein the first codec configuration includes adaptive multi-rate wideband (AMR-WB) codec configuration, AMR-WB/G.718 interoperable (IO) codec configuration, enhanced voice services (EVS) AMR-WB IO codec configuration, EVS wideband (WB), super-wideband (SWB) codec configuration, or EVS WB, SWB channel aware codec configuration.

19. A non-transitory computer-readable medium including instructions that, when executed by one or more processors of a device, cause the one or more processors to:
- determine a packet loss rate, the packet loss rate associated with one or more first packets encoded based on a first codec configuration and received at the device from a second device; and
- based on a determination that the packet loss rate satisfies a first packet loss rate threshold and that a second codec configuration is available to the device, send, to the second device, a request to receive packets from the second device based on a second codec configuration.

20. The non-transitory computer-readable medium of claim 19, wherein the instructions, when executed by the one or more processors, cause the one or more processors to, responsive to determining that a de-jitter buffer packet loss rate indicator has a particular value, determine the packet loss rate based on a count of pre-de-jitter buffer packet loss events.

21. An apparatus comprising:
- means for determining a packet loss rate at a first device, the packet loss rate associated with one or more first packets encoded by a decoder based on a first codec configuration and received at the first device from a second device; and
- means for, based on a determination that the packet loss rate satisfies a first packet loss rate threshold and that a second codec configuration is available to the first device, sending, to the second device, a request to receive packets from the second device based on a second codec configuration.

22. The apparatus of claim 21, wherein, responsive to a de jitter buffer packet loss rate indicator having a particular value, the packet loss rate is based on a count of post-de-jitter buffer packet loss events.

\* \* \* \* \*